(12) United States Patent
Kojima et al.

(10) Patent No.: US 11,721,185 B2
(45) Date of Patent: Aug. 8, 2023

(54) APPARATUS, METHOD AND STORAGE MEDIUM FOR DETECTING STATE CHANGE AND CAPTURING IMAGE

(71) Applicant: Yokogawa Electric Corporation, Tokyo (JP)

(72) Inventors: Osamu Kojima, Tokyo (JP); Atsushi Wada, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 17/336,309

(22) Filed: Jun. 2, 2021

(65) Prior Publication Data

US 2021/0407263 A1 Dec. 30, 2021

(51) Int. Cl.
G08B 13/196 (2006.01)

(52) U.S. Cl.
CPC . *G08B 13/19604* (2013.01); *G08B 13/19645* (2013.01); *G08B 13/19656* (2013.01); *G08B 13/19695* (2013.01)

(58) Field of Classification Search
CPC ........ G08B 13/19604; G08B 13/19645; G08B 13/19695; G08B 13/19656; H04N 7/183; H04N 7/188; H04B 10/116
See application file for complete search history.

(56) References Cited

U.S. PATENT DOCUMENTS

| | | | | |
|---|---|---|---|---|
| 9,361,011 B1 * | 6/2016 | Burns | ................. | G06F 16/7328 |
| 10,395,504 B1 * | 8/2019 | Hutz | ..................... | G08B 29/04 |
| 11,302,156 B1 * | 4/2022 | Gordiichuk | ...... | G08B 13/19684 |
| 2007/0216764 A1 * | 9/2007 | Kwak | ................. | G07C 9/00309 348/14.06 |
| 2009/0189981 A1 * | 7/2009 | Siann | ..................... | H04N 7/185 348/143 |
| 2016/0093180 A1 | 3/2016 | Fitzgibbon | | |
| 2016/0134932 A1 * | 5/2016 | Karp | ................... | H04N 5/23222 348/207.11 |
| 2017/0070657 A1 | 3/2017 | Yokomizo | | |
| 2017/0206273 A1 | 7/2017 | Tannenbaum | | |
| 2019/0138795 A1 | 5/2019 | Vaidya | | |
| 2020/0143644 A1 * | 5/2020 | Scalisi | ............. | G08B 13/19695 |

FOREIGN PATENT DOCUMENTS

| | | |
|---|---|---|
| GB | 2449718 A | 12/2008 |
| JP | 2006054591 A | 2/2006 |
| JP | 2007328601 A | 12/2007 |
| JP | 2010122801 A | 6/2010 |

(Continued)

OTHER PUBLICATIONS

Extended European Search Report for counterpart European Application No. 21178552.2, issued by the European Patent Office dated Oct. 25, 2021.

(Continued)

*Primary Examiner* — Rowina J Cattungal (57) ABSTRACT

Provided is an apparatus including: a detecting unit configured to detect a state change of sound or light emitted from an external security apparatus to external environment; and a controlling unit configured to, in response to the detecting unit detecting the state change, cause a surveillance camera to capture images or apply a tag on image data being captured by the surveillance camera.

16 Claims, 3 Drawing Sheets

(56) References Cited

FOREIGN PATENT DOCUMENTS

JP          2015162232 A    9/2015
WO          2010045404 A2   4/2010

OTHER PUBLICATIONS

Office Action issued for counterpart Japanese Application No. 2020-110040, issued by the Japan Patent Office dated May 17, 2022 (drafted on May 12, 2022).
Office Action issued for counterpart Chinese Application 202110465607.7, issued by The State Intellectual Property Office of People's Republic of China dated Jan. 12, 2023.

* cited by examiner

APPARATUS, METHOD AND STORAGE MEDIUM FOR DETECTING STATE CHANGE AND CAPTURING IMAGE

The contents of the following Japanese patent application(s) are incorporated herein by reference:
2020-110040 filed in JP on Jun. 25, 2020

BACKGROUND

1. Technical Field

The present invention relates to an apparatus, a method, and a storage medium.

2. Related Art

Conventionally, a variety of security systems using surveillance cameras have been proposed (see, e.g., Patent Document 1).
Patent Document 1: Japanese Patent Application Publication No. 2015-162232

SUMMARY

A first aspect of the present invention provides an apparatus. The apparatus may include a surveillance camera. The apparatus may include a detecting unit configured to detect a state change of sound or light emitted from an external security apparatus to external environment. The apparatus may include a controlling unit configured to, in response to the detecting unit detecting the state change, cause the surveillance camera to capture images or apply a tag on image data being captured by the surveillance camera.

A second aspect of the present invention provides a method performed on a computer including a surveillance camera. The method may include detecting a state change of sound or light emitted from an external security apparatus to external environment. The method may include controlling for, in response to the detecting of the state change at a detection step, causing the surveillance camera to capture images or applying a tag on image data being captured by the surveillance camera.

A third aspect of the present invention provides a storage medium with a program recorded thereon. The program may cause a computer to function as a surveillance camera. The program may cause the computer to function as a detecting unit configured to detect a state change of sound or light emitted from an external security apparatus to external environment. The program may cause the computer to function as a controlling unit configured to, in response to the detecting unit detecting the state change, cause the surveillance camera to capture images or apply a tag on image data being captured by the surveillance camera.

The summary clause of the invention described above does not necessarily describe all necessary features of the embodiments of the present invention. The present invention may also be a sub-combination of the features described above.

DESCRIPTION OF EXEMPLARY EMBODIMENTS

Hereinafter, while the present invention will be described below by means of the embodiments, these embodiments below are not intended to limit the invention defined by the claims. All combinations of features set forth in the embodiments are not necessarily essential to the solutions of the present invention.

Figure 1:
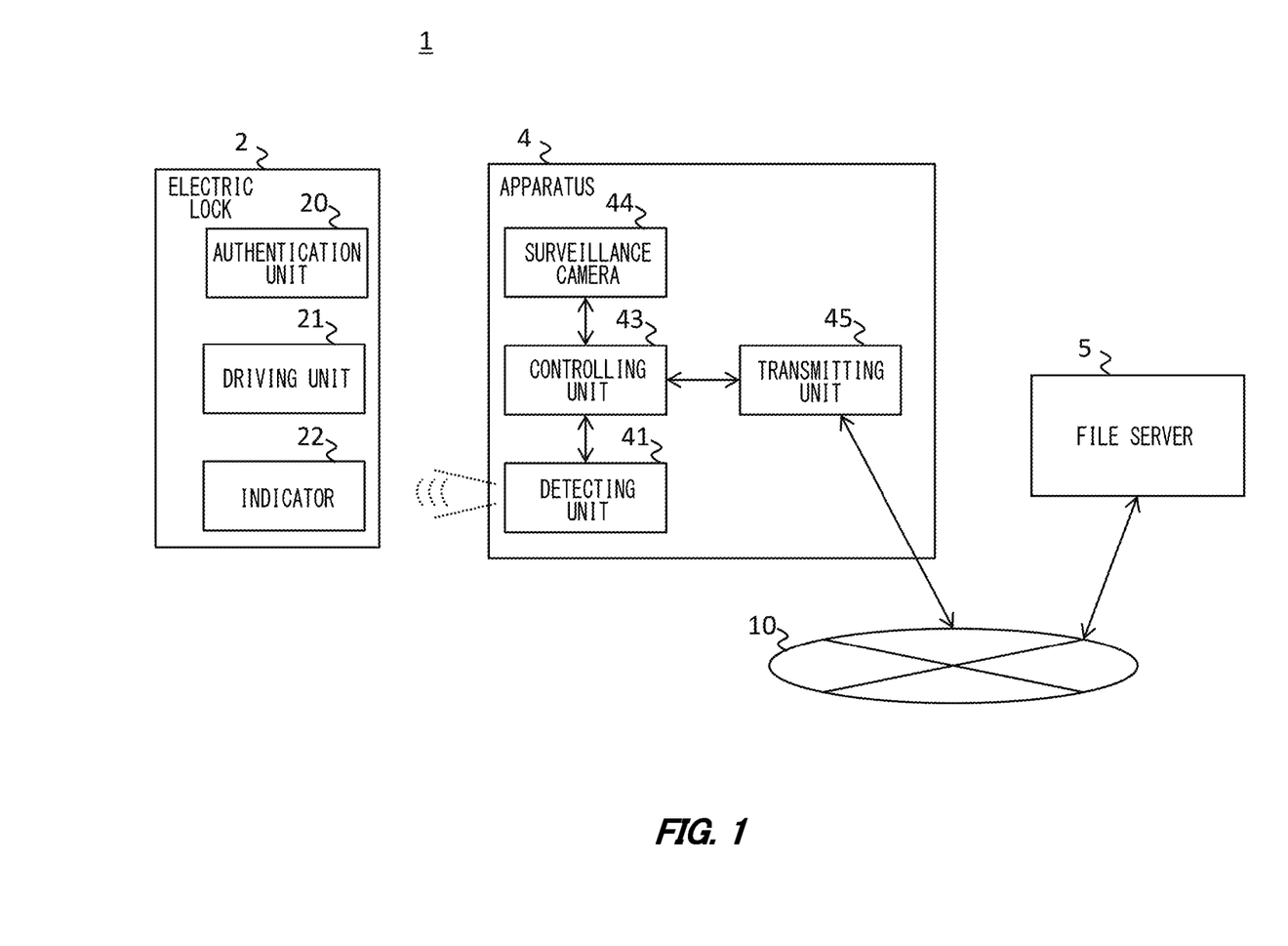
FIG. 1 shows a security system 1 according to the embodiment.

[1. Security System 1] FIG. 1 shows a security system 1 according to the embodiment. The security system 1 includes an electric lock 2, an apparatus 4, and a file server 5.

Herein, among the components of the security system 1, the electric lock 2 and the apparatus 4 may not be connected to each other, while the apparatus 4 and the file server 5 may be connected to each other via a communication network 10. The communication network 10 may be composed of various networks including the Internet, a wide area network (WAN), a local area network or the like, or the combinations thereof. The communication network 10 may include, at least either of wired or wireless, connection points. The communication network 10 may be implemented by a dedicated line, separate from a public line such as the Internet.

[1.1. Electric Lock 2] The electric lock 2 is an example of a security apparatus which may be a lock incorporating an electric locking/unlocking mechanism. The electric lock 2 includes an authentication unit 20, a driving unit 21, and an indicator 22.

The electric lock 2 may be arranged at an entrance of facilities. The facilities may include plants, or otherwise schools or houses, stations, museums, hospitals, and shops (e.g., restaurants). Plants include, other than industrial plants such as chemical or bio-engineering plants or the like, plants for managing/controlling gas or oil or other wellheads and surroundings, plants for managing/controlling hydroelectric, thermal, or nuclear power generation or the like, plants for managing/controlling solar or wind energy or other environmental power generation, and plants for managing/controlling waterworks or dams or the like. An entrance of a facility may include an entrance provided at a boundary between the inside and outside of the facility, or an entrance provided at a boundary between one area and another area in the facility.

[1.1-1. Authentication Unit 20] The authentication unit 20 authenticates a person who locks/unlocks the electric lock 2.

The authentication unit 20 may authenticate the person who locks/unlocks the lock based on authentication information provided in or on a key used by the person, or based on biological information of the person who locks/unlocks the lock (e.g., such as the fingerprint, iris, and vein authentication), or based on a password (e.g., a pin code), which is input via an unillustrated input device. The authentication unit 20 may provide an authentication result to the driving unit 21.

When the electric lock 2 is locked/unlocked with a key, the key may take a card form. Authentication information of a key may be provided on the surface of the key physically by imprinting, printing, or pasting, magnetically by an RF tag, or electrically on the surface of or inside the key.

[1.1-2. Driving unit 21] The driving unit 21 locks/unlocks a lock of the electric lock 2. In this embodiment, as an example, the driving unit 21 may lock/unlock the lock in response to the authentication unit 20 determining that the person who performs locking/unlocking is an authenticated person. A power source of the driving unit 21 may be a battery or a power supply provided in the facility.

[1.1-3. Indicator 22] The indicator 22 is provided on the surface of the electric lock 2 and may indicate the state of the electric lock 2 by emitting light. The state of the electric lock 2 may be at least one of an unlocked state, a locked state, or a transition state between the unlocked and locked states. When these states are indicated by the light emitted from the indicator 22, the state change of the light can indicate that an operation is done on the electric lock 2.

For the indicator 22 indicating that the electric lock 2 is either in the unlocked or locked state, the electric lock 2 may be provided with a sensor (not shown) for detecting the state of the lock portion to supply a detection signal from the sensor to the indicator 22. When the indicator 22 indicates that the electric lock 2 is in the transition state, a signal to indicate that the driving unit 21 is driving may be supplied from the driving unit 21 to the indicator 22.

The indicator 22 may have at least one light emitting lamp, which may emit light with a color corresponding to the state of the electric lock 2.

The electric lock 2 described above may be connected to any other unillustrated server which constitutes, along with the electric lock 2, another security system that is different from the security system 1.

[1.2. Apparatus 4] The apparatus 4 cooperates with the electric lock 2 provided outside the apparatus 4 to support security services at the facility. The apparatus 4 has a detecting unit 41, a controlling unit 43, a surveillance camera 44, and a transmitting unit 45.

[1.2-1. Detecting unit 41] The detecting unit 41 detects the state change of light emitted from the electric lock 2 to the external environment. The detecting unit 41 may detect the state change of light emitted from the indicator 22 of the electric lock 2. This enables detection of operations of the electric lock 2 (e.g., locking or unlocking operations).

The detecting unit 41 may detect that a preset light is emitted. While it may detect a light emitted when the electric lock 2 malfunctions; in this embodiment, as an example, it detects a light emitted when the electric lock 2 operates normally. For example, the detecting unit 41 may detect the light emitted from the indicator 22 indicating that the electric lock 2 is in any of unlocked, locked, and transition states. The detecting unit 41 may supply a signal to the controlling unit 43, which indicates that the state change of light is detected.

[1.2-2. Controlling unit 43] The controlling unit 43, in response to the detecting unit 41 detecting the state change, causes the surveillance camera 44 to capture images. In this embodiment, as an example, the controlling unit 43 may supply an instruction signal to instruct the surveillance camera 44 to capture images. The controlling unit 43 may further control each component of the apparatus 4.

[1.2-3. Surveillance Camera 44] The surveillance camera 44 captures images. The imaging area of the surveillance camera 44 may or may not include the entrance provided with the electric lock 2. The imaging area may be either inside or outside of the facility.

The surveillance camera 44 may capture images every time it receives the instruction signal for capturing images from the controlling unit 43. The surveillance camera 44 may capture images at a point in time to generate still image data, or may capture images within a reference time width to generate moving image data. The surveillance camera 44 may capture images at 30 f/s, for example, when capturing moving image data. The surveillance camera 44 may be a visible light camera, or may be an infrared or ultraviolet light camera (e.g., an X-ray camera). The surveillance camera 44 may store the captured image data in a storage area (not shown) of the apparatus 4.

[1.2-4. Transmitting unit 45] The transmitting unit 45, an example of a first transmitting unit, transmits the image data captured by the surveillance camera 44 to the file server 5. The transmitting unit 45 may transmit the captured image data to the file server 5 every time the surveillance camera 44 captures images, or transmit the captured and accumulated image data to the file server 5 regularly, based on the control by the controlling unit 43.

Additionally or alternatively, the transmitting unit 45, which may be an example of a second transmitting unit, may transmit the image data captured by the surveillance camera 44 or location information of the image data to a transmission destination corresponding to the electric lock 2, in response to the detecting unit 41 detecting the state change. The transmission destination corresponding to the electric lock 2 may be: for example, the above-described server connected to the electric lock 2; a security company which installed the electric lock 2; a local police station, a fire station, or an emergency hospital including the facility; or a preset person such as an administrator of the facility. The location information of the image data may be an address of the image data in the apparatus 4 or the file server 5, or the time of day when the images are captured.

[1.3. File Server 5] The file server 5 is accessible by other devices different from the apparatus 4 (e.g., a server connected to the electric lock 2 or a security company which installed the electric lock 2), and shares files to store with those other devices. The file server 5 may be accessible by several devices simultaneously.

[1.4. Effects Obtained by Security System 1] The apparatus 4 of the security system 1 described above causes the surveillance camera 44 to capture images in response to the detection of the state change of light emitted from the electric lock 2 to the external environment, so that the images are captured based on the operations of the electric lock 2. Thus, the surveillance camera 44 which is not connected to the electric lock 2 can obtain the image data based on the timing of operations of the electric lock 2.

With detecting the state change of light emitted from the indicator 22, the images can be captured reliably based on the operations of the electric lock 2.

With detecting that a preset light is emitted, the images can be captured based on specific operations of the electric lock 2.

With the image data captured by the surveillance camera 44 being transmitted to the file server 5, it can increase the accessibility to the image data while preventing an access concentration to the apparatus 4.

With the image data or its location information being transmitted to a transmission destination corresponding to the electric lock 2 in response to the detecting unit 41 detecting the state change, the image data captured by the surveillance camera 44 can be confirmed early. By presetting a facility administrator or the like as the transmission destination, it can facilitate the confirmation of when and by whom the electric lock 2 is locked/unlocked. This can facilitate the confirmation operations such as whether the locking/unlocking is done at a predefined time, whether the locking/unlocking is done at a time different from the predefined time, or whether the locking/unlocking is done by a predefined person.

Figure 2:
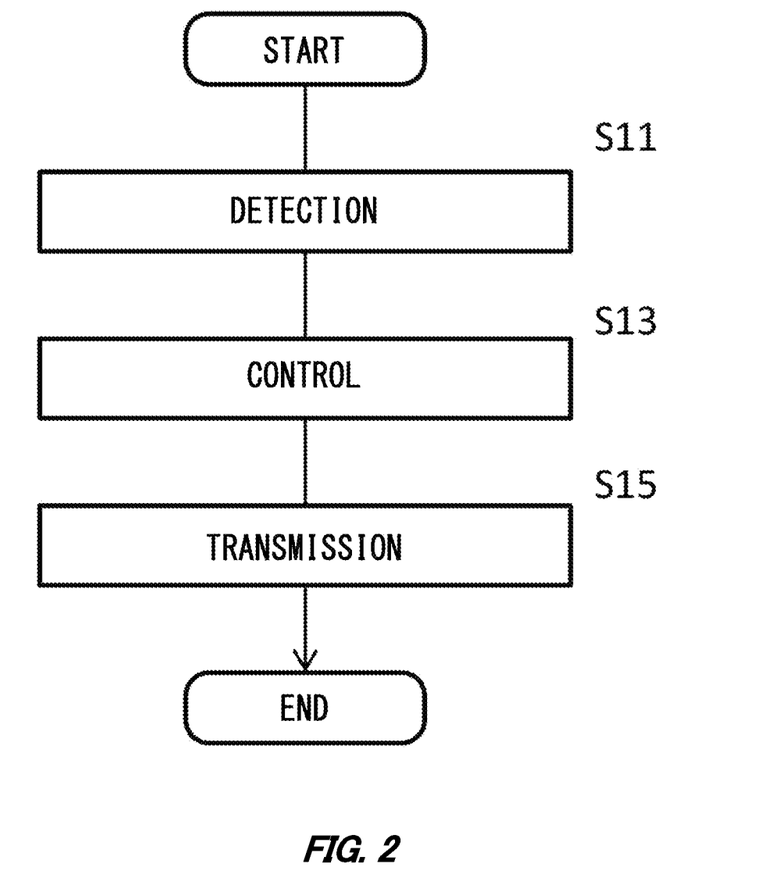
FIG. 2 shows operations of an apparatus 4.

[2. Operations of Apparatus 4] FIG. 2 shows operations of the apparatus 4. The apparatus 4 supports security services at the facility by operating processes of Steps S11 to S15.

At Step S11, when the electric lock 2 operates to cause a state change of light emitted from the indicator 22, the detecting unit 41 detects the state change of light. At Step S13, the controlling unit 43 causes the surveillance camera 44 to capture images. Then, at step S15, the transmitting unit 45 transmits the captured image data to the file server 5, and transmits the image data or its location information to a transmission destination corresponding to the electric lock 2.

[3. Variations] While the embodiments described above state that the apparatus 4 has the transmitting unit 45, the apparatus may not have the transmitting unit 45. In this case, the image data captured by the surveillance camera 44 and stored within the apparatus 4 may be accessible by external devices.

While the indicator 22 of the electric lock 2 has been described to indicate the state of the electric lock 2 (e.g., such as the locked, unlocked, and transition states), it may indicate an authentication result by the authentication unit 20. In this case, the detecting unit 41 may, regardless of the content of the authentication result, detect the emission of the light indicating the authentication result or detect the emitted light indicating that the person who performs locking/unlocking is not an authenticated person.

While the detecting unit 41 has been described to detect that a preset light is emitted, it may detect that a preset light is no longer emitted. For example, the indicator 22 may emit light indicating that the electric lock 2 is in a standby state, while the detecting unit 41 may detect that the light is no longer emitted. In this case, the image data can be obtained from the surveillance camera 44 which is not connected to the electric lock 2, the image data being taken in response to the electric lock 2 no longer operating normally due to breakdown or the like. The preset light being no longer emitted may mean that a constantly emitted light is no longer made or that a light which had been emitted at regular intervals is no longer emitted.

While the detecting unit 41 has been described to detect the state change of light emitted from the electric lock 2, it may detect the state change of sound emitted from the electric lock 2. In this case, the detecting unit 41 may detect that a preset sound is emitted (e.g., an operation sound of locking/unlocking is emitted or a sound corresponding to the authentication result by the authentication unit 20 is emitted), or detect that a preset sound is no longer emitted (e.g., an operation sound caused by the electric lock 2 in a standby state is no longer made). Herein, the sound to be detected may be a sound emitted when the electric lock 2 operates normally or a sound emitted when the electric lock 2 malfunctions. The preset sound being no longer emitted may mean that a constantly emitted sound is no longer made or that a sound which had been emitted at regular intervals is no longer emitted.

While the security apparatus external to the apparatus 4 has been described as the electric lock 2, it may be other security apparatuses. In this case, the detecting unit 41 may detect the state change of sound or light emitted from the other security apparatus; for example, it may detect that the preset sound or light is emitted or no longer emitted. Herein, the other security apparatus may have a sensor and a generating unit for emitting sound or light to the external environment. The sensor may detect abnormalities in a target area, for example, including any of an intrusion detection sensor for detecting intrusion into the target area, a human sensor for detecting presence of a person in the target area, an opening/closing sensor for detecting open/close of a door or window in the target area, and a fire sensor for detecting heat or smoke generated in the target area. The sensor may include an ultrasound sensor, a microwave sensor, an infrared sensor, a wire sensor, a trap sensor, an electric field sensor, a magnet sensor, a temperature sensor and so on. As an example, the other security apparatus may be a sensor light (also referred to as a security light), or a fire alarm.

The security apparatus may be other surveillance cameras different from the surveillance camera 44. The other surveillance camera may be installed outside the apparatus 4, and may have an indicator for indicating that the other surveillance camera is recording images. In this case, the detecting unit 41 may detect the state change of light emitted from the indicator of the other surveillance camera. As an example, the detecting unit 41 may detect that the indicator emits light. In this case, the image data captured by the surveillance camera 44 can be obtained in response to the recording operations of the other surveillance camera. The detecting unit 41 may also detect that the indicator no longer emits light. In this case, the image data can be obtained, which is captured by the surveillance camera 44 in response to the other surveillance camera no longer operating normally due to breakdown or the like. The surveillance camera 44 and other surveillance camera may or may not share at least a portion of the imaging areas.

While the surveillance camera 44 has been described to capture images every time it receives an instruction signal from the controlling unit 43, it may capture images constantly. In this case, the controlling unit 43 may apply a tag on the image data being captured by the surveillance camera 44 in response to the detecting unit 41 detecting light or sound. Also in this case, the surveillance camera 44 which is not connected to the electric lock 2 can also obtain the image data based on the timing of operations of the electric lock 2. When the surveillance camera 44 captures images constantly, the transmitting unit 45 may transmit the image data along with the tag to the file server 5. The transmitting unit 45 may transmit the image data to the file server 5 regularly.

Various embodiments of the present invention may be described with reference to the flowchart and block diagrams, wherein the blocks may represent: (1) steps of a process for performing operations; or (2) sections of an apparatus having functions to perform operations. A specific step or section may be implemented by a dedicated circuit, a programmable circuit provided with computer-readable instructions stored on a computer-readable medium, and/or a processor provided with computer-readable instructions stored on a computer-readable medium. The dedicated circuit may include a digital and/or analog hardware circuit, or may include an integrated circuit (IC) and/or a discrete circuit. The programmable circuit may include a reconfigurable hardware circuit, including logic operations such as logic AND, logic OR, logic XOR, logic NAND, logic NOR, and the like, as well as memory elements such as a flip-flop, a register, a field programmable gate array (FPGA), and a programmable logic array (PLA).

The computer-readable medium may include any tangible device that can store instructions to be performed by a suitable device, so that the computer-readable medium having instructions stored therein comprises a product including instructions that can be executed to configure means for performing operations specified in the flowchart or block diagrams. Examples of the computer-readable medium may include an electronic storage medium, a magnetic storage medium, an optical storage medium, a magneto-electric storage medium, a semiconductor storage medium and so on. More specific examples of the computer-readable medium may include a floppy (registered trademark) disk, a diskette, random access memory (RAM), read-only memory (ROM), erasable programmable read-only memory (EPROM or flash memory), electrically-erasable programmable read-only memory (EEPROM), static random access memory (SRAM), compact disc read-only memory (CD-ROM), a digital versatile disk (DVD), a Blu-ray (registered trademark) disk, a memory stick, an integrated circuit card and so on.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as Smalltalk, JAVA (registered trademark), or C++, and conventional procedural programming languages, such as C programming languages or similar programming languages.

The computer-readable instructions may be provided to processors or programmable circuits of general-purpose computers, special-purpose computers, or other programmable data processing apparatuses, locally or via local area network (LAN) or wide area network (WAN) such as the Internet, wherein the computer-readable instructions are executed for configuring means for performing the operations specified in the flowchart or block diagrams. The processors include, for example, a computer processor, a processing unit, a microprocessor, a digital signal processor, a controller, a microcontroller and so on.

Figure 3:
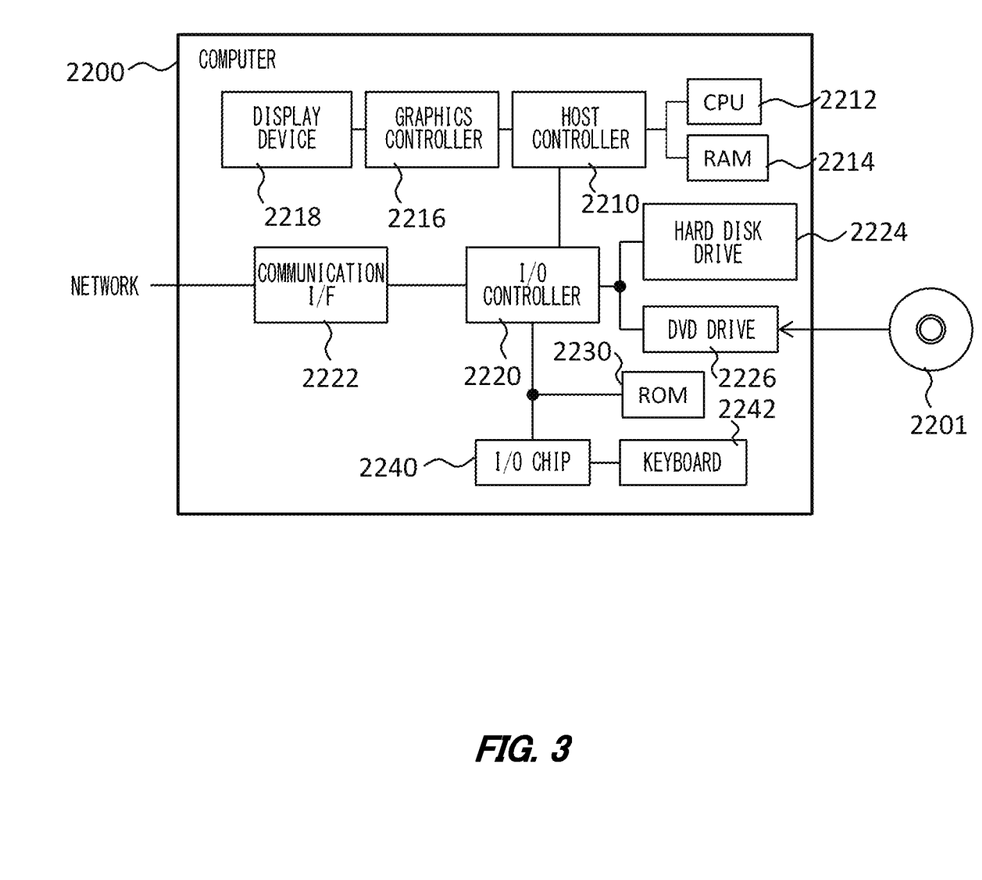
FIG. 3 shows an exemplary computer 2200 in which several aspects of the present invention may be wholly or partially embodied.

FIG. 3 shows an exemplary computer 2200 in which several aspects of the present invention may be wholly or partially embodied. A program installed in the computer 2200 can cause the computer 2200 to perform operations associated with the apparatus according to the embodiments of the present invention or function as one or more sections of the apparatus, or can cause the computer 2200 to perform the operations or the one or more sections, and/or can cause the computer 2200 to perform a process or steps of the process according to the embodiments of the present invention. Such a program may be executed by a CPU 2212 to cause the computer 2200 to perform specific operations associated with some or all of the blocks in the flowchart and block diagrams described in the specification.

The computer 2200 according to the present embodiment includes the CPU 2212, a RAM 2214, a graphics controller 2216, and a display device 2218, which are connected to each other via a host controller 2210. The computer 2200 also includes a communication interface 2222, a hard disk drive 2224, a DVD-ROM drive 2226, and an I/O unit such as an IC card drive, which are connected to the host controller 2210 via an I/O controller 2220. The computer further includes a legacy I/O unit such as a ROM 2230 and a keyboard 2242, which are connected to the I/O controller 2220 via an I/O chip 2240.

The CPU 2212 operates in accordance with a program stored in the ROM 2230 and the RAM 2214, thereby controlling each unit. The graphics controller 2216 obtains image data generated by the CPU 2212 in a frame buffer or the like provided in the RAM 2214 or in the RAM 2214 itself, so that the image data is displayed on the display device 2218.

The communication interface 2222 communicates with other electronic devices via a network. The hard disk drive 2224 stores a program and data used by the CPU 2212 in the computer 2200. The DVD-ROM drive 2226 reads out a program or data from a DVD-ROM 2201, and provides the program or data to the hard disk drive 2224 via the RAM 2214. The IC card drive reads out a program or data from an IC card, and/or write a program or data in the IC card.

The ROM 2230 stores a boot program or the like executed by the computer 2200 upon activation, and/or a program dependent on hardware of the computer 2200. The I/O chip 2240 may also connect various I/O units to the I/O controller 2220 via a parallel port, a serial port, a keyboard port, a mouse port, or the like.

A program is provided to a computer-readable medium such as the DVD-ROM 2201 or IC card. The program is read out from the computer-readable medium, installed in the hard disk drive 2224, the RAM 2214, or the ROM 2230 serving also as an example of the computer-readable medium, and executed by the CPU 2212. Such a program describes information processing, which is read out by the computer 2200 to link the program with the various types of hardware resources as mentioned above. The apparatus or method may be configured by implementing information operation or processing using the computer 2200.

For example, upon communication between the computer 2200 and an external device, the CPU 2212 may execute a communication program loaded in the RAM 2214 and, based on the processing described in the communication program, instruct the communication interface 2222 to perform communication processing. The communication interface 2222, under control of the CPU 2212, reads out transmission data stored in a transmission buffer processing area provided in a recording medium such as the RAM 2214, the hard disk drive 2224, the DVD-ROM 2201, or the IC card, and transmits the read-out transmission data to a network, or otherwise writes received data received from the network in a reception buffer processing area or the like provided in the recording medium.

The CPU 2212 may allow the RAM 2214 to read out all or necessary parts of a file or database stored in an external recording medium, such as the hard disk drive 2224, the DVD-ROM drive 2226 (DVD-ROM 2201), and the IC card, to perform various types of processing for the data stored on the RAM 2214. The CPU 2212 then writes back the processed data in the external recording medium.

Various types of information such as various types of programs, data, tables, and databases may be stored in the storage medium for information processing. On the data read out from the RAM 2214, the CPU 2212 may perform various types of processing including various types of operations, information processing, condition determination, conditional branching, unconditional branching, information retrieval/conversion and so on, which are described anywhere in the present disclosure and specified by an instruction sequence of a program, and write back the result in the RAM 2214. The CPU 2212 may also retrieve information in a file or database or other in the recording medium. For example, when the recording medium stores a plurality of entries each having a first attribute value associated with a second attribute value, the CPU 2212 may retrieve an entry from the plurality of entries that satisfies a condition where the first attribute value is satisfied, read out the second attribute value stored in the entry, thereby obtaining the second attribute value associated with the first attribute value that satisfies a predetermined condition.

The programs or software modules described above may be stored on the computer 2200 or a computer-readable medium in the vicinity of the computer 2200. A storage medium such as a hard disk or RAM provided in a server system connected to a dedicated communication network or the Internet is usable as a computer-readable medium, thereby providing a program to the computer 2200 via the network.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, method and so on shown in the claims, embodiments, or diagrams can be performed in any order as long as the order is not indicated by "prior to," "before," or the like and as long as the output from a previous process is not used in a later process. Even if the operating flow is described using phrases such as "first" or "next" in the claims, embodiments, or diagrams, it does not necessarily mean that the process must be performed in this order.

EXPLANATION OF REFERENCES

1: security system; 2: electric lock; 4: apparatus; 5: file server; 10: communication network; 20: authentication unit; 21: driving unit 22: indicator; 41: detecting unit; 43: controlling unit; 44: surveillance camera; 45: transmitting unit; 2200: computer; 2201: DVD-ROM; 2210: host controller; 2212: CPU; 2214: RAM; 2216: graphics controller; 2218: display device; 2220: I/O controller; 2222: communication interface; 2224: hard disk drive; 2226: DVD-ROM drive; 2230: ROM; 2240: I/O chip; 2242: keyboard

What is claimed is:

1. A security system comprising:
    an electric lock, including:
        an authentication unit configured to authenticate a person who locks or unlocks the electric lock, wherein the electric lock is configured to emit sound or light indicating an authentication result by the authentication unit; and
    an apparatus not connected to the electric lock via a communication network and including:
        at least one processor;
        a surveillance camera;
        a detecting unit configured to detect a state change of the sound or the light emitted from the electric lock to external environment using the at least one processor; and
        a controlling unit configured to, in response to the detecting unit detecting the state change, cause the surveillance camera to capture images or apply a tag on image data being captured by the surveillance camera using the at least one processor.

2. The security system according to claim 1, wherein the detecting unit is configured to detect that a preset sound or light is emitted from the electric lock.

3. The security system according to claim 2, further comprising:
    another surveillance camera not connected to the apparatus via the communication network having a recording indicator, wherein the recording indicator indicates that recording is in process by the another surveillance camera, wherein
    the detecting unit is configured to detect a state change of light emitted from the indicator of the another surveillance camera.

4. The security system according to claim 2, wherein the apparatus further includes a first transmitting unit configured to transmit image data captured by the surveillance camera to a file server accessible by another device using the at least one processor.

5. The security system according to claim 2, wherein the apparatus further includes a second transmitting unit configured to, in response to the detecting unit detecting the state change, transmit image data captured by the surveillance camera or location information of the image data to a transmission destination corresponding to the electric lock using the at least one processor.

6. The security system according to claim 1, wherein the detecting unit is configured to detect that a preset sound or light is no longer emitted from the electric lock.

7. The security system according to claim 6, further comprising:
    another surveillance camera not connected to the apparatus via the communication network having a recording indicator, wherein the recording indicator indicates that recording is in process by the another surveillance camera, wherein
    the detecting unit is configured to detect a state change of light emitted from the indicator of the another surveillance camera.

8. The security system according to claim 6, wherein the apparatus further includes a first transmitting unit configured to transmit image data captured by the surveillance camera to a file server accessible by another device using the at least one processor.

9. The security system according to claim 6, wherein the apparatus further includes a second transmitting unit configured to, in response to the detecting unit detecting the state change, transmit image data captured by the surveillance camera or location information of the image data to a transmission destination corresponding to the electric lock using the at least one processor.

10. The security system according to claim 1, further comprising:
    another surveillance camera not connected to the apparatus via the communication network having a recording indicator, wherein the recording indicator indicates that recording is in process by the another surveillance camera, wherein
    the detecting unit is configured to detect a state change of light emitted from the indicator of the another surveillance camera.

11. The security system according to claim 10, wherein the apparatus further includes a first transmitting unit configured to transmit image data captured by the surveillance camera to a file server accessible by another device using the at least one processor.

12. The security system according to claim 10, wherein the apparatus further includes a second transmitting unit configured to, in response to the detecting unit detecting the state change, transmit image data captured by the surveillance camera or location information of the image data to a transmission destination corresponding to the electric lock using the at least one processor.

13. The security system according to claim 1, wherein the apparatus further includes a first transmitting unit configured to transmit image data captured by the surveillance camera to a file server accessible by another device using the at least one processor.

14. The security system according to claim 1, wherein the apparatus further includes a second transmitting unit configured to, in response to the detecting unit detecting the state change, transmit image data captured by the surveillance camera or location information of the image data to a transmission destination corresponding to the electric lock using the at least one processor.

15. A method performed by a computer comprising a surveillance camera, comprising:

detecting a state change of sound or light emitted from an electric lock, wherein the sound or the light indicates an authentication result of authenticating a person who locks or unlocks the electric lock, wherein the surveillance camera is not connected to the electric lock via a communication network;

in response to detecting the state change, causing the surveillance camera to capture images or applying a tag on image data being captured by the surveillance camera.

16. A non-transitory computer readable storage medium with a program recorded thereon, which is configured to cause a computer to function as:

a surveillance camera;

a detecting unit configured to detect a state change of sound or light emitted from an electric lock, wherein the sound or the light indicates an authentication result of authenticating a person who locks or unlocks the electric lock, wherein the surveillance camera is not connected to the electric lock via a communication network; and a controlling unit configured to, in response to the detecting unit detecting the state change, cause the surveillance camera to capture images or apply a tag on image data being captured by the surveillance camera.

* * * * *